United States Patent [19]

Coppola et al.

[11] 4,372,352
[45] Feb. 8, 1983

[54] FOAM DISPENSING APPARATUS

[75] Inventors: Pasquale J. Coppola, Meriden; Gerald V. Dever, Jr., Milford, both of Conn.

[73] Assignee: Olin Corporation, New Haven, Conn.

[21] Appl. No.: 241,899

[22] Filed: Mar. 9, 1981

[51] Int. Cl.³ .............................................. B65B 3/04
[52] U.S. Cl. ........................................ 141/1; 141/90; 141/157; 141/192; 52/743; 222/136; 366/2
[58] Field of Search ............... 366/1, 2; 222/148, 149, 222/150, 151, 136, 71; 141/1, 9, 192-198, 100-107, 89-92, 392, 94-96, 129-191; 52/743; 425/4 R, 817 R, 145, 150, 257, 261

[56] References Cited

U.S. PATENT DOCUMENTS

| | | | |
|---|---|---|---|
| 3,031,271 | 4/1962 | Weinbrenner et al. | 23/252 |
| 3,212,674 | 10/1965 | Martin | 222/136 |
| 3,409,044 | 11/1968 | Sobek et al. | 137/607 |
| 3,771,490 | 11/1973 | Kinney et al. | 222/136 |
| 3,975,128 | 8/1976 | Schlüter | 222/136 |
| 4,108,606 | 8/1978 | Wingard | 23/252 |
| 4,158,535 | 6/1969 | Dever. | |
| 4,223,811 | 9/1980 | Czegledi | 222/136 |
| 4,318,431 | 3/1982 | Evans | 141/90 |

FOREIGN PATENT DOCUMENTS 730201 3/1966 Canada .................................. 400/6

OTHER PUBLICATIONS

"The Best Of Both Worlds", by Stanley Johnson, *The Construction Specifier*, pp. 47-50, May, 1980.

*Primary Examiner*—Houston S. Bell, Jr.
*Attorney, Agent, or Firm*—Ralph D'Alessandro; Donald F. Clements; Thomas P. O'Day

[57] ABSTRACT

In a foam dispensing head for discharging foam in a low pressure system there is provided at least first and second orifice rods rotatably insertable within receiving bores cooperative respectively with adjacent first and second mix component infeed ports, each rod having a plurality of predetermined sized orifices therein through which the mix components flow under pressure to a mixing chamber in impinging fashion to selectively permit the desired flow rate of mix components to be maintained into the mixing chamber so as to insure proper admixing of the foam at selected predetermined flow rates.

15 Claims, 7 Drawing Figures

FOAM DISPENSING APPARATUS

BACKGROUND OF THE INVENTION

The present invention relates generally to foam dispensing apparatus and more particularly to improved orifice rods utilized within a foam dispensing head that is employed in a particular method of filling building blocks with an insulating foam. Specifically, the improved orifice rods selectively permit the desired flow rate of the mixed components to be maintained into a mixing chamber within the foam dispensing head to insure proper admixing of the foam at selected predetermined flow rates.

New and valuable uses for urethane and isocyanurate polymer compositions continue to be developed. Frequently, these uses require the development of suitable apparatus to store as well as dispense the desired polymer composition. Apparatus has been developed to permit the appropriate polymer compositions to be used as portable foaming devices which can be taken to the site where such foam is required. Alternately, stationary foam dispensing apparatus, such as reaction injection molding machines, have been developed which have been utilized to inject urethane or isocyanurate polymer compositions into fixed molds. In either approach, dispensing heads or guns have been designed which permit the urethane or isocyanurate polymer components to be mixed within either a gun or a mixing head to form the desired end product foam prior to the foam being dispensed.

The recent focusing of attention on energy saving techniques has created an interest in developing building blocks which may be insulated during their construction so that buildings utilizing such blocks have additional insulation in the sidewalls or foundation and are therefore more energy efficient.

One of the problems encountered in designing a system to be able to manufacture foam filled building blocks, such as concrete blocks, has been devising an economical and labor extensive way of adding the insulating material to the block. Insulated concrete blocks have been produced by either pressure fitting a preformed insulating material, usually a polystyrene, into the core area, or by the addition of loose fill insulation into the cavities in the blocks after the blocks have been put in place on the construction site. The former method of pressure fitting the polystyrene into the building block dramatically increases the labor costs and slows down the production line along which the blocks are produced. Systems employing this technique create a bottle neck on the production line. The latter technique of adding insulation is also labor intensive and is unsatisfactory because of the natural settling that tends to occur with the loose-filled insulating material over a period of time.

The adaption of existing urethane or isocyanurate polymer dispensers to a system which would economically permit concrete or other building blocks to be filled during their manufacture presents many of the problems previously encountered in the development of such dispensing equipment. However, it also presents additional problems which need to be addressed, such as the adaptation of dispensing equipment to a static position which can quickly inject the insulating foam into a great number of blocks within a very short time period without interruption.

Minimizing the amount of manual labor in a production line is highly desirable. The automation of a system to fill the blocks as they pass along a production line also requires that various conditions be automatically sensed and the desired response activation automatically occur. Typical of these is the sensing of a bank of blocks at a predetermined point along the fixed path of travel of the blocks along the production line so that the dispensing head and related apparatus may be automatically activated to inject the blocks with foam. Additionally, the large number of repetitions which will occur in the operation of the dispensing apparatus requires that the apparatus be able to function whenever a minimal mis-alignment in dispensing equipment occurs without damaging the equipment. Finally, because building blocks vary in size it is essential that foam be dispensible at preselected variable rates so that different sized blocks with insulating cavities may be filled on the same production line. It is also necessary, since the urethane or isocyanurate polymer compositions harden after a short period of time, that the dispensing equipment be essentially self-cleaning so that repeated use of the equipment, i.e. the injection of "shots" of foam into the blocks, will occur without clogging the dispensing apparatus.

The foregoing problems are solved in both the design of the apparatus and the method utilized to automatically fill the voids or cavities of the building blocks with an insulating foam utilizing a low pressure multiple flow orifice dispensing head having an improved plunger design.

SUMMARY OF THE INVENTION

It is a principal object of the present invention to provide apparatus that may be employed in low pressure urethane and isocyanurate polymer mixed storage systems to produce appropriate foam for injection into building blocks as an insulating material.

It is another object of the present invention to provide a dispensing head for dispensing urethane and isocyanurate polymer foams that is self-cleaning and solventless.

It is another object of the present invention to provide an economical, automated method of filling building blocks with insulating foam.

It is a further object of the present invention that dispensing apparatus be capable of dispensing the insulating foam at variable preselected rates.

It is still another object of the present invention to provide an improved plunger design within the dispensing head.

It is a feature of the present invention that apparatus is provided on the foam dispensing head to automatically clean any residue foam to prevent clogging and freezing up of the moving components therein.

It is another feature of the present invention that variable preset flow rates of insulating foam may be selected for injection into the blocks.

It is a further feature of the present invention that the plunger utilized within the foam dispensing head employs a design that automatically compensates for minute mis-alignment of parts and torquing forces that occur during operation.

It is yet another feature of the present invention that a blast of air is automatically sent across the face of the plunger to remove residue foam therefrom after each shot of foam is injected into the building block.

It is still a further feature of the present invention that impingement mixing of the foam components in a mixing chamber within the dispensing head is utilized for relatively short durations with a relatively low pressure foam mix components storage system.

It is an advantage of the present invention that an economical and automated method of filling building blocks is provided.

It is another advantage of the present invention that the apparatus is adaptable for use in low pressure rigid urethane or isocyanurate components storage system.

These and other objects, features, and advantages are obtained by utilizing a method of automatically filling the cavities in building blocks with insulating foam material by employing a low pressure multiple flow orifice within a foam dispensing head that has an improved plunger design.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
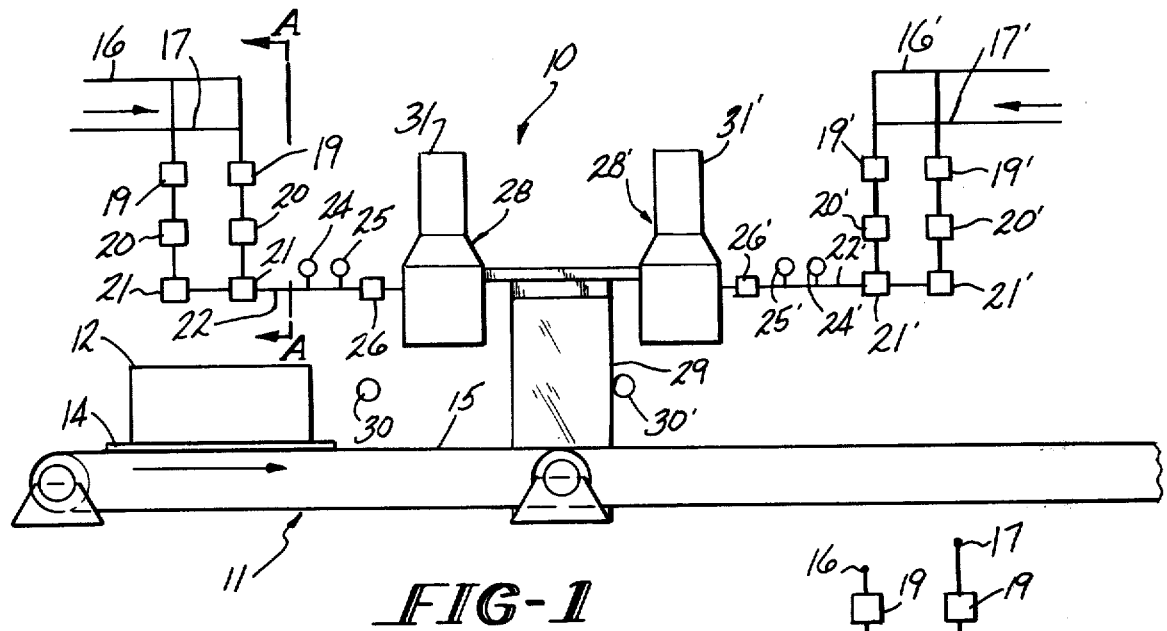
FIG. 1 is a diagrammatic side elevational illustration of the foam dispensing apparatus employed within a building block production line wherein the blocks are passed beneath the foam dispensing heads while they are filled with foam.
Figure 1A:
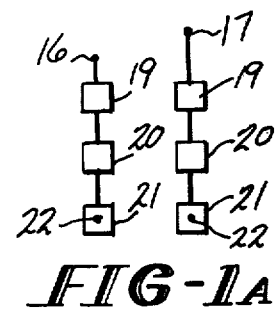
FIG. 1A is a partial sectional view taken along the lines A—A of FIG. 1 showing diagrammatically the filters, flow controllers and solenoid valves that are on each foam mix component bulk flow line.

FIG. 1 shows a diagrammatic illustration of the foam insulation injecting apparatus 10 overlying a building block conveyor 11. Building blocks 12 are placed on pallets 14 which are conveyed along the conveying platform 15 of conveyor 11. The foam injecting apparatus 10 includes foam mix component bulk flow lines 16 and 17. Lines 16 and 17 have sequentially placed therein filters 19, flow controllers 20, and solenoid valves 21. Each line 16 and 17 has two filters 19, flow controllers 20, and solenoid valves 21 connected to it, as illustrated in FIG. 1. Lines 16 and 17 are positioned side by side as seen in FIG. 1A. The flow controllers 20 are of piston/spring design to compensate for temperature and viscosity variations of the foam mix components to provide a relatively constant flow rate. Such controllers are commercially available from Gould Industry. Solenoid valves 21 could equally well be manual valves or any other suitable apparatus which permit the desired flow rate of foam to be obtained.

Leaving the solenoid valves 21, the foam mix components pass through dispensing head infeed lines 22, only one of which is shown. Each line has fastened thereto a pressure gauge 24, a temperature gauge 25, and a ratioing valve 26. A check valve, not shown, could also be employed between the temperature gauge and the ratioing valve. Infeed lines 22 then feed into the bank of foam dispensing heads, indicated generally by the numeral 28 in FIG. 1. As best seen in FIG. 1, there is provided an alternate or back up bank of dispensing heads 28' with corresponding infeed lines 22', temperature gauges 25', pressure gauges 24', ratioing valves 26', solenoid valves 21', flow controllers 20', filters 19' and mix component bulk flow lines 16' and 17'. The banks of dispensing heads 28 and 28' are supported by a support structure 29 so that the banks overlay the moving conveyor 11.

Photoelectric sensing apparatus 30 and 30' is positioned at a level to be able to detect the movement of the bank of blocks at the predetermined point in the path of travel along the conveyor so as to signal the air cylinders 31 and 31', as appropriate, to activate the plunger 35 within each individual foam dispensing head 32 to permit the foam mix components to flow into the individual foam dispensing heads 32. The photoelectric sensing apparatus 30 and 30' may be in the form of photoelectric controls with reflective plates, such as that supplied commercially by Microswitch, Inc. Photoelectric sensing apparatus 30' is intended to be used with the alternate or back-up bank of dispensing heads 28' and air cylinders 31'.

Figure 2:
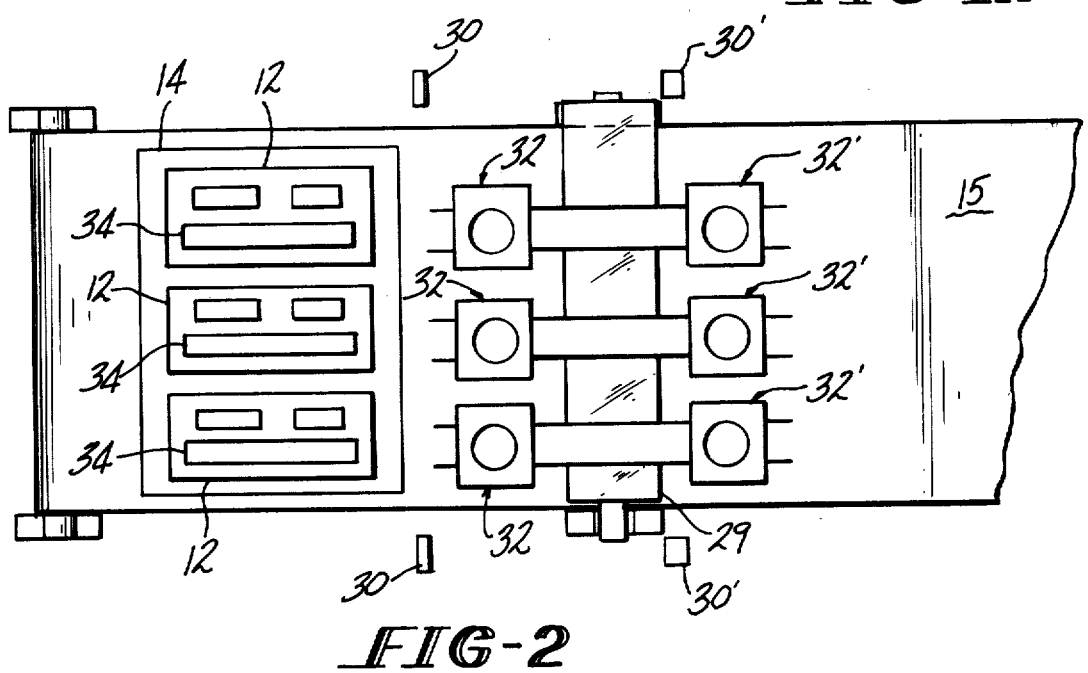
FIG. 2 is a diagrammatic top elevational view of the foam dispensing heads overlaying the building block conveyor shown in FIG. 1 wherein a bank of three blocks is passed beneath the foam dispensing heads.

FIG. 2 shows the foam injection assembly line partially in diagrammatic form from an overhead view. The primary bank of foam dispensing heads 28, comprised of the individual foam dispensing heads 32, and the alternate or back-up bank of foam dispensing heads 28', similarly comprised of the individual foam dispensing heads 32' are shown mounted atop the supporting structure 29 overlying the conveyor 11. Also seen on pallet 14 is a bank of blocks 12, each block 12 having a foam insulating cavity 34 into which the insulating foam is injected by the individual foam dispensing heads 32 as the blocks pass thereunder.

It should be noted that the alternate bank of foam dispensing heads 28' will be utilized only should one of the individual foam dispensing heads 32 in the primary bank of foam dispensing heads 28 become inoperative. This back-up bank permits the conveyor line to continue to operate while repairs are made to the primary bank of foam dispensing heads 28.

Figure 3:
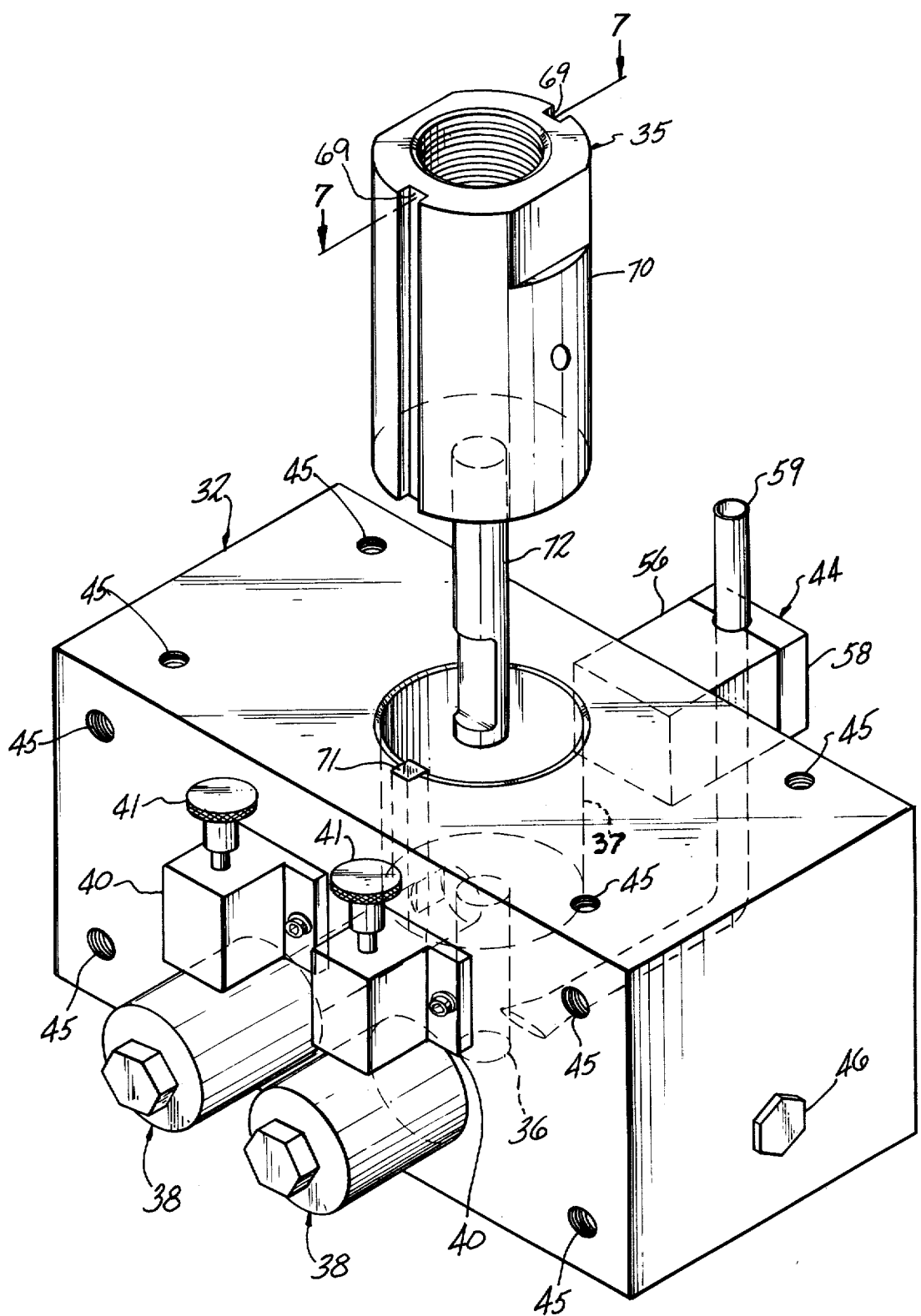
FIG. 3 is a side perspective view of the dispensing head having the plunger elevated in a partially exploded position to better illustrate its structure.
Figure 4:
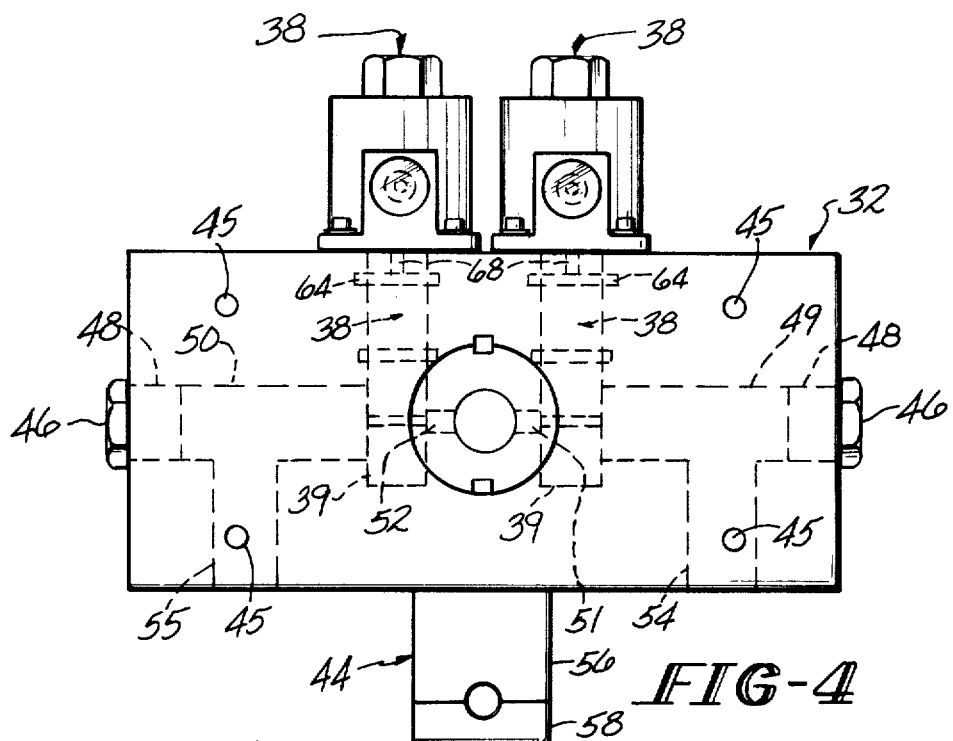
FIG. 4 is a top elevational view of the foam dispensing head.
Figure 5:
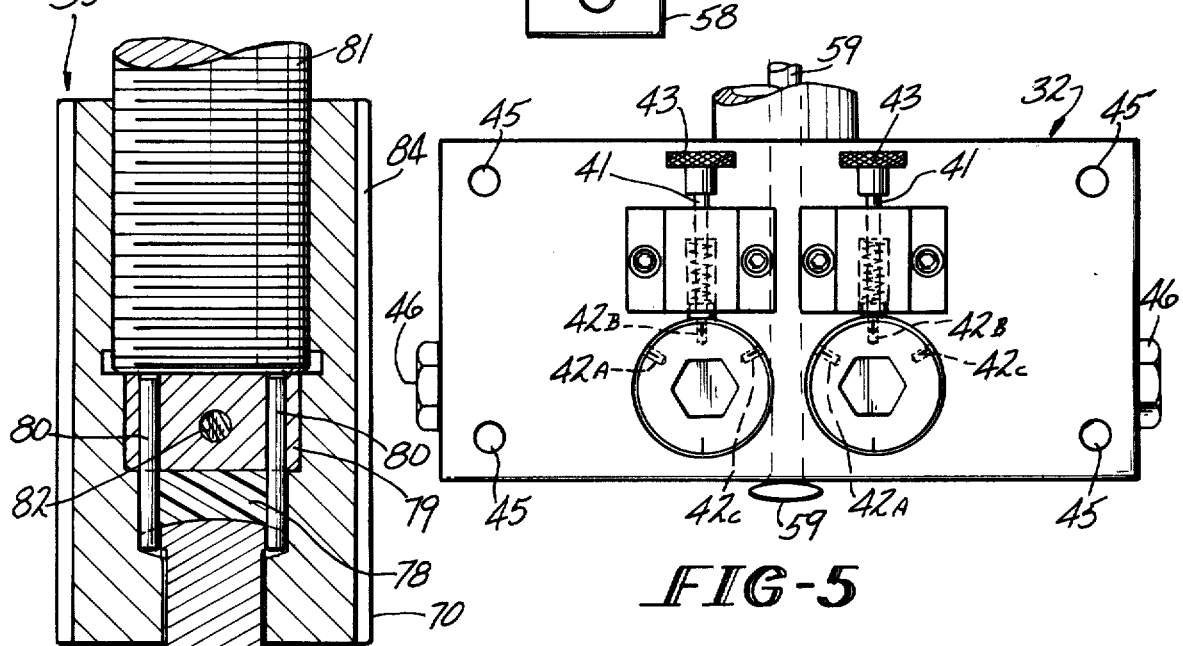
FIG. 5 is a front elevational view of the foam dispensing head.

FIGS. 3, 4, and 5 show the individual foam dispensing head 32. As best seen in FIG. 3, the foam dispensing head 32 has a reciprocating plunger, indicated generally by the numeral 35, which is utilized to control the flow of foam mix components into the mixing chamber 36. The pair of orifice rods, indicated generally by the numeral 38, are insertable within predetermined sized bores 39 in the front side of the individual foam dispensing heads 32. Orifice rod indexing apparatus 40 overlies each orifice rod 38 and includes a locking and indexing plunger 41 which is insertable within a plurality of receiving openings 42, see briefly FIG. 6. Fixed to the rear of the head 32 is foam residue removing apparatus, indicated generally by the numeral 44.

Looking now in more detail at the individual foam dispensing head 32, it can be seen that the surface of this head has a plurality of threaded holes 45 on the top and front. Those holes on the top of the heads 2 are utilized to mount the brackets (not shown) which support the air cylinders 31 and 31'. The holes 45 on the front of the head 32 are used to mount the head to the supporting structure 29 when the heads are arrayed in the banks 28 over the conveyor 11. As best seen in FIG. 4, plugs 46 cap threadways 48 which are utilized to provide access to machine mix component passages 49 and 50 which lead to infeed ports 51 and 52 respectively. Foam mix component fill ports 54 and 55 have been machined into the rear of the head 32 so that dispensing head infeed lines 22 may be connected thereto to transport the foam mix components from the storage containers via the foam mix component bulk flow lines 16 and 17 (not shown) to the foam dispensing heads 32.

Attached to the rear of the foam dispensing head 32 is the foam residue removing apparatus indicated generally in FIG. 3 by the numeral 44. This consists of a tube retaining bracket block 56 which is suitably fastened, such as by screws (not shown) to the back of the individual foam dispensing head 32. Tube 59 is retained between tube retaining bracket block 56 and the tube retaining bracket plate 58 by the tightening of the aforementioned screws which also pass through tube retaining bracket plate 58. Tube 59 is L-shaped, as best seen in FIG. 3 so that compressed air which is forced through it from an external source (not shown) is directed beneath the individual foam dispensing head 32 to provide a jet of high speed air to blow any residue foam from the bottom portion of the plunger 35, as will be described in more detail hereafter.

Figures 6, 7:
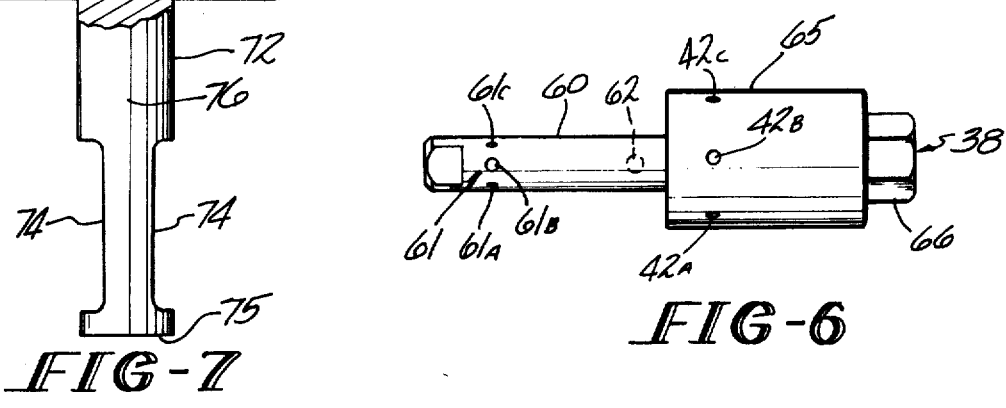
FIG. 6 is a side elevational view of an orifice rod.
FIG. 7 is a side elevational view of the dispensing head plunger taken along the section line 7—7 of FIG. 3 with the partially shown rod end of the air cylinder threaded into the center of the plunger.

As previously mentioned, orifice rods 38 are inserted within the orifice rod bores 39 on the front side of the individual foam dispensing head 32. The structure of the individual orifice rod 38 is best seen in FIG. 6 wherein the rod is shown as comprising three distinct portions. The innermost portion is the orifice portion 60 wherein a plurality of predetermined sized holes have been machined through the entire diameter of the rod to provide the flow passages for the particular form mix components to flow from the appropriate infeed port to the plunger bore 36 where mixing of the foam components occurs and through which ejection of the completely mixed foam takes place. Thus, in essence, the plunger bore serves as a mixing chamber for the foam mix components which impinge with each other therein as the components exit infeed ports 51 and 52 of FIG. 4.

In the preferred embodiment, there are three sets of holes 61 in the orifice portion 60 of each orifice rod 38. Holes 61 are best seen in FIG. 6 as 61A, 61B, and 61C, and correspond to low, high, and medium flow rates, respectively. The desired flow rate is obtained by opening either one or both of the aforementioned solenoid valves 21 on each of the foam mix component bulk flow lines 16 and 17, in conjunction with the flow controllers 20 which are preset to govern the flow of foam components mix therethrough. The holes 61 in orifice rods 38 serve to regulate the backpressure within the dispensing head infeed lines 22. This backpressure determines the orifice rod exit or impingement pressure of the foam mix components when the mix impinges within the mixing chamber portion of bore 36. This orifice rod exit or impingement pressure, and hence the backpressure, is critical to obtain a properly mixed foam product. The holes 61A, 61B, and 61C corresponding to the low, medium, and high flow rates were selected to meet the requirements to fill differently sized cavities within the blocks 12 while maintaining approximately 130 to 140 psi orifice rod exit or impingement pressure at approximately 80° F. to ensure proper admixing of the foam mix components. The following Table shows the approximate building block cavity width and exemplary corresponding orifice rod hole 61 size and flow rates at 80° F.:

| cavity (inches) | orifice hole diameter (inches) | flow rate (lbs./min.) |
| --- | --- | --- |
| 4⅞" | .106 | 40.9 (high) |
| 2-9/16" | .078 | 23.6 (medium) |
| 1⅛" | .067 | 17.3 (low) |

It should be noted that at higher temperatures, lower impingement pressures can give acceptable foam mix quality because of resulting viscosity decreases in foam mix components. Thus, as best understood from the diagrammatic illustration in FIG. 1, the low and medium flow rates are obtained by opening the appropriate one of the two solenoid valves 21 on flow lines 16 and 17. The high flow rate is then obtained by opening both of the solenoid valves 21 at the same time.

Each orifice rod 38 further has on the orifice portion 60, a retaining pin 62 which fits within groove 64, see briefly FIG. 4, within each orifice rod bore 39 to lock the orifice rods 38 within the individual foam dispensing head 32. The end of each orifice rod 38 adjacent the holes 61A, 61B, and 61C has a flat surface indented from the arcuate periphery to provide an unoccupied area within the orifice rod 38 and the orifice rod bore 39 where any liquid which may accumulate therein may displace so that the orifice rod 38 may be inserted fully and easily without resisting pressure because of undisplaceable liquid. Slots 68, best seen in FIG. 4, are machined into the foam dispensing head 32 from the topmost portion of the orifice rod bores 39 to permit the retaining pins 62 to be slid into the bores 39 until retaining pin 62 is seated within grooves 64.

Referring to FIG. 6, a jacket portion 65 is adjacent the orifice portion 60 of the orifice rod 38 and is suitably fastened thereto. End portion 66 attaches to the orifice portion 60 and abuts the jacket portion 65 to provide a convenient means of grasping and turning the orifice rods to the desired operating position. Alternately end portion 66 may be a machined extension of orifice portion 60.

The orifice rod indexing apparatus 40 cooperates with the receiving openings 42 to index and retain the orifice rods 38 in positions 42A, 42C, and 42B which correspond to the low, medium, and high flow rate holes 61A, 61C, and 61B, respectively in the orifice rod portion 60. The locking and indexing plungers 41 in each orifice rod indexing apparatus 40 are spring loaded as best seen in FIG. 5 and may be raised from the appropriate receiving opening 42 by grasping the plunger handle portion 43 and raising the locking and indexing plunger 41 until the locking and indexing plunger 41 is out of engagement with the receiving opening 42.

Plunger 35 is seen in exploded view in FIG. 3 and in cross-sectional detail in FIG. 7. As best seen in FIG. 3, the plunger 35 has a pair of opposing keyways 69 machined into the barrel base portion 70. The plunger 35 is designed so that either of the keyways 69 may be used to seat on key 71 such that the plunger moves along a fixed track as it reciprocates during operation. The unseated keyway 69 can serve as an accessway for lubricant which is added to the head and plunger. The lubricant forms a reservoir (not shown) at the bottom portion of the enlarged diameter section 37, see briefly FIG. 3, of plunger bore 36. This lubricant serves the dual purpose of reducing friction between the plunger 35 and the sides of the plunger bore 36 as well as serving as an antifoaming agent to prevent the undesired buildup of foam within the head 32 which would hinder and possibly stop the reciprocating movement of plunger 35.

Still referring to FIGS. 3 and 7, contoured rod portion 72 extends from the barrel base portion 70 of plunger 35. Contoured rod portion 72 has two symmetrical inset portions 74, which reduce the amount of surface area which can be in contact with the foam during operation and thereby reduces resistance to the reciprocating movement of the plunger 35. The bottom 75 of the plunger 35 returns to its full diameter as a flat bottomed surface. When in the raised position, the bottom 75 of the plunger 35 is above the infeed port 51 and 52 for the foam mix components so that the foam mix components are free to flow under pressure into the mixing chamber 36 where they are admixed to form the desired insulating foam. When the plunger 35 is in its fully lowered position, the upper portion 76 of the plunger 35 seats with its arcuate periphery against both infeed ports 51 and 52 to prevent the flow of the foam mix components into the mixing chamber 36. Since the air cylinder 31 moves the plunger 35 between its fully raised and fully lowered position, the bottom of plunger 75 on its downward stroke to the fully lowered position accumulates foam along its bottom surface as it pushes foam out of the dispensing head 32. It is any of this residue foam which is removed from the bottom of the plunger 75 by the stream of compressed air that is forced through the tube 59 of the foam residue removing apparatus 44.

Plunger 35 is further seen in FIG. 7 as having a compression cap 78. Compression cap 78 is adjacent the retaining cap 79, both of which are connected by appropriate aligning pins 80 to the contoured rod portion 72 to prevent the contoured rod portion 72 of plunger 35 from rotating. Pins 80 are typically press fit into retaining cap 79 and align with receiving slots within compression cap 78. A retaining cap pin 82 fastens retaining cap 79 and the adjacent compression cap 78 to the plunger housing 84 to keep the retaining cap 79 from rotating within plunger housing 84. The compression cap 78 is assembled to the retaining cap 79 in such a fashion that the rod portion 72 of the plunger 35 can minutely pivot to correct for any angular mis-alignment, move laterally to correct for colinear mis-alignment and rotate to compensate for any twisting forces that may be imparted to the plunger 35 by the reciprocating movement of the plunger within the plunger bore 36. Threads 81 within the center of plunger 35 are utilized to fasten the plunger to the appropriate moving component of the air cylinder 31.

In operation, a bank of building blocks 12 is passed from curing apparatus onto a pallet 14 along a conveyor 11. The conveyor 11 moves the pallet 14 with building blocks 12 along the conveyor platform 15. The presence of the bank of building blocks 12 is sensed by the photoelectric sensing apparatus 30 which sends a signal to the air cylinders 31 for the primary bank of foam in dispensing heads 28 to move the plunger 35 to its fully raised position. This permits the flow of foam component mix, typically resin and isocyanate, through their individual component mix bulk flow lines 16 and 17 to pass through filters 19, the flow controllers 20 and the solenoid valves 21 into the foam mix infeed lines 22. Along lines 22 the foam component mix is monitored by pressure gauges 24 and temperature gauges 25. Ratioing valves 26 are positioned along lines 22 to permit sampling of the foam mix components to ensure that the proper by weight ratio of foam mix components is being supplied to each dispensing head 32. The foam mix components pass from infeed lines 22 into foam mix component fill ports 54 and 55 and pass therein to infeed ports 51 and 52. With the plunger 35 in its fully raised position the foam mix components are injected under pressure into the mixing chamber 36 where they are admixed to form the desired insulating foam. This procedure occurs within a time sequence such that the admixed foam is ejected downwardly from the plunger bore 36 into the insulation cavities 34 of the building blocks 12 which are now passing beneath the individual foam dispensing heads 32. The duration of this "shot" of foam is either timed by appropriate timing device or controlled by a second set of photoelectric sensing apparatus to determine the location of the blocks 12 at a point along the conveyor 11 which requires the cessation of the feeding of the foam mix components into the individual foam dispensing heads 32.

At the end of the desired time of foam ejection, the air cylinders 31 are activated to lower the plunger 35 so that the upper portion of plunger 76 with its arcuate periphery comes into contact with the infeed ports 51 and 52 to close off the ports and stop the flow of foam component mix into the mixing chamber portion of plunger bore 36. Simultaneously with the lowering of the plunger 35 into its fully lowered position, a blast of high-pressure air is sent through the tube 59 of the foam residue removing apparatus 44 to remove any residue foam from the bottom 75 of plunger 35.

The foam injecting apparatus has thus gone through a complete cycle along a production assembly line which will permit, with the continuance of this method, the rapid and economical filling of insulating cavities within building blocks.

While the preferred structure in which the principles of the present invention have been incorporated is shown and described above, it is to be understood that the invention is not to be limited to the particular details thus presented, but in fact, widely different means may be employed in the practice of the broader aspects of this invention. For example, the orifice rod exit or impingement pressure necessary to ensure proper admixing of the foam mix components within the mixing chamber of the dispensing heads may fall within a range as broad as 85 psi to 190 psi with the type of apparatus disclosed herein. It is to be understood that this exit or impingement pressure range will be influenced by the temperature of the foam mix components and the ambient temperature viscosity of the foam mix components. Also, the varying of the desired flow rates would require differently sized orifice rod holes to maintain the desired exit or impingement pressure necessary to ensure the proper admixing of the foam mix components.

The scope of the appended claims is intended to encompass all obvious changes in the details, materials, and arrangement of parts which will occur to one of skill in the art upon a reading of the disclosure.

Having thus described the invention, what is claimed is:

1. In a foam dispensing head with at least first and second receiving bores and a discharge port for dispensing foam which is admixed in a mixing chamber within the head, the head having at least first and second mix component infeed ports into which the mix components are premetered by external flow controllers, the foam being dispensed in a flow in shots of predetermined duration, the flow of mix components being controlled by a reciprocating plunger movable between a first flow position and a second non-flow position, the improvement comprising:

at least first and second orifice rods rotatably insertable within the receiving bores cooperative respectively with the adjacent first and second mix component infeed ports, each rod having a plurality of predetermined sized orifices therein through which the mix components flow under pressure to the mixing chamber in impinging fashion to selectively permit the premetered mix components to flow into the mixing chamber within a predetermined exit pressure range so as to insure proper admixing of the foam at the selected predetermined flow rates.

2. The apparatus according to claim 1 wherein the orifice rods are elongate and cylindrical in shape, each having a longitudinal axis passing therethrough.

3. The apparatus according to claim 2 wherein the orifice rods are selectively rotatable about the longitudinal axis within the receiving bores to a plurality of selected positions, each position corresponding to the positioning of the orifices in flow communication between the mix component infeed ports and the mixing chamber.

4. The apparatus according to claim 3 wherein the orifices in each orifice rod are radially arrayed about the periphery of each rod and opposing pairs, each one of each opposing pair generally being diametrically opposite the other of the opposing pair on the periphery.

5. The apparatus according to claim 4 wherein the plunger is reciprocatingly mounted at least partially within the discharge port and has an elongate plunger rod having a longitudinal axis passing therethrough, the plunger rod being insertable within the discharge port and mounted to a plunger housing via mounting means so that the plunger rod is at least partially rotationally movable about the longitudinal axis and is also finitely movable laterally.

6. The apparatus according to claim 5 wherein the plunger further comprises a base portion to which is appropriately fastened a retaining cap, the retaining cap being connected to a deformable compression cap in a manner that permits the plunger rod to minutely rotate and compensate for any rotational forces imparted to the plunger during its reciprocating movement within the discharge port.

7. The apparatus according to claim 6 wherein the retaining cap is connected to the deformable compression cap in a manner that permits the plunger rod to displace laterally to correct any colinear misalignment or minutely pivot to correct any angular misalignment within the plunger bore.

8. The apparatus according to claim 7 wherein the foam dispensing head is cooperative with a cleaning means so that when the plunger is in the second non-flow position the cleaning means automatically removes the residue foam from the plunger rod.

9. The apparatus according to claim 8 wherein the cleaning means further comprises an air tube that directs a stream of compressed forced air across the plunger rod to remove the residue foam.

10. A method of filling building blocks with an insulating foam utilizing foam dispensing apparatus having a plurality of orifice rods with predetermined sized orifices therein to control the impingement pressure of the plural feed foam mix components as the components enter the mixing chamber within each foam dispensing head; comprising the steps of:
(a) feeding a plurality of blocks with predetermined cavities therein in arrayed banks along a predetermined path of travel;
(b) automatically sensing the presence of a bank of blocks at a first predetermined point along the predetermined path;
(c) preselecting a predetermined sized orifice for each orifice rod;
(d) automatically activating the foam dispensing apparatus in response to the sensing of the bank of blocks to cause the plural feed foam mix components to be passed through orifices into a mixing chamber within each foam dispensing head at a predetermined impingement pressure to ensure the proper admixing of the plural foam mix components into a mixed foam;
(e) automatically injecting the mixed foam into the cavities of the blocks in the sensed bank; and
(f) automatically ceasing injecting the mixed foam into the cavities of the blocks after a predetermined amount of time.

11. The method of claim 10 further comprising the steps of:
(a) automatically sensing the presence of the bank of blocks at a second predetermined point along the predetermined path of travel; and
(b) automatically sending a signal to the foam dispensing apparatus to cease injecting the mixed foam into the cavities of the blocks by stopping the flow of the feed foam mix components through the orifices.

12. The method according to claims 10 or 11 further comprising the step of:
automatically cleaning the foam dispensing apparatus at the end of each foam injection period.

13. The apparatus according to claim 1 wherein the predetermined exit pressure range is from about 85 pounds per square inch to about 190 pounds per square inch.

14. The apparatus according to claim 1 wherein the predetermined exit pressure range is from about 100 pounds per square inch to about 160 pounds per square inch.

15. The apparatus according to claim 1 wherein the predetermined exit pressure range is from about 120 pounds per square inch to about 150 pounds per square inch.

* * * * *